United States Patent
Teurlay et al.

(10) Patent No.: US 9,389,130 B2
(45) Date of Patent: Jul. 12, 2016

(54) ASSEMBLY, SYSTEM AND METHOD FOR CABLE TENSION MEASUREMENT

(75) Inventors: Lucas Teurlay, Amiens (FR); Stephane Breard, Oust-Marest (FR); Dominique Aubry, Hallencourt (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 541 days.

(21) Appl. No.: 13/640,060

(22) PCT Filed: Apr. 8, 2011

(86) PCT No.: PCT/IB2011/051510
§ 371 (c)(1),
(2), (4) Date: Mar. 19, 2013

(87) PCT Pub. No.: WO2011/125046
PCT Pub. Date: Oct. 13, 2011

(65) Prior Publication Data
US 2013/0167658 A1    Jul. 4, 2013

Related U.S. Application Data

(63) Continuation of application No. 12/757,146, filed on Apr. 9, 2010, now abandoned.

(51) Int. Cl.
*G01L 5/04* (2006.01)
*G01L 5/10* (2006.01)

(52) U.S. Cl.
CPC .. *G01L 5/04* (2013.01); *G01L 5/103* (2013.01)

(58) Field of Classification Search
CPC ........... G01L 5/103; G01L 5/04; G01L 5/101; G01L 5/042; G01L 5/06; G01L 5/10; A01K 89/00; A01K 89/01555; A01K 89/01556; A01K 89/015; A01K 89/0155
USPC ................................. 73/862.041, 862.44, 826
See application file for complete search history.

(56) References Cited

U.S. PATENT DOCUMENTS

| | | | |
|---|---|---|---|
| 5,560,560 A * | 10/1996 | Hirose | A01K 89/015 242/223 |
| 6,591,222 B2 * | 7/2003 | Stiner | 702/173 |
| 6,658,783 B1 * | 12/2003 | Yamanaka | 43/25 |
| 6,829,952 B2 * | 12/2004 | Stanley et al. | 73/862.391 |
| 6,935,590 B2 * | 8/2005 | Karwaczynski | 242/390.8 |
| 6,988,854 B2 * | 1/2006 | Porter | 405/165 |
| 7,066,036 B2 | 6/2006 | Ochovo | |

(Continued)

FOREIGN PATENT DOCUMENTS

EP    478023 A1    4/1992

*Primary Examiner* — Freddie Kirkland, III

(57) ABSTRACT

A tension measurement assembly, for measuring and monitoring a tension force in a cable being deployed from a spooling device on which the cable is spooled, comprises at least one force sensor disposed adjacent the spooling device for sensing a force applied to the spooling device and generating a force signal representing the sensed force, and a processor responsive to the force signal for calculating and monitoring a tension force present in the cable. A cable sensor engages the deployed cable for sensing a spooling/unspooling rate and a length of the cable moving past the cable sensor in a predetermined time period and generating a spooling signal representing the sensed rate and length to the processor for use in the calculating and monitoring of the tension force.

13 Claims, 2 Drawing Sheets

(56) References Cited

U.S. PATENT DOCUMENTS

| | | |
|---|---|---|
| 7,478,563 B2 | 1/2009 | Weisman |
| 7,559,499 B2 * | 7/2009 | Nakagawa ............ A01K 89/015 242/246 |
| 7,600,600 B2 * | 10/2009 | Inuzuka et al. ................ 180/272 |
| 7,683,564 B2 | 3/2010 | Harris et al. |
| 7,806,007 B2 * | 10/2010 | Murphy et al. .......... 73/862.391 |
| 7,878,447 B2 * | 2/2011 | Hartzheim ................. 242/615.2 |
| 7,895,908 B2 * | 3/2011 | Fujiwara et al. ......... 73/862.627 |
| 8,839,547 B2 * | 9/2014 | Pekin ............................... 43/17 |
| 2003/0113092 A1 | 6/2003 | Porter |
| 2003/0150283 A1 | 8/2003 | Stanley et al. |
| 2004/0232268 A1 | 11/2004 | Karwaczynski |
| 2005/0211812 A1 * | 9/2005 | Nakagawa ............ A01K 89/015 242/223 |
| 2006/0037405 A1 | 2/2006 | Madden et al. |
| 2008/0017739 A1 | 1/2008 | Beckham |
| 2008/0150891 A1 | 6/2008 | Berkley et al. |
| 2010/0000143 A1 | 1/2010 | Pekin |
| 2010/0072316 A1 | 3/2010 | Hartzheim |
| 2011/0251803 A1 * | 10/2011 | Teurlay et al. .................. 702/43 |

* cited by examiner

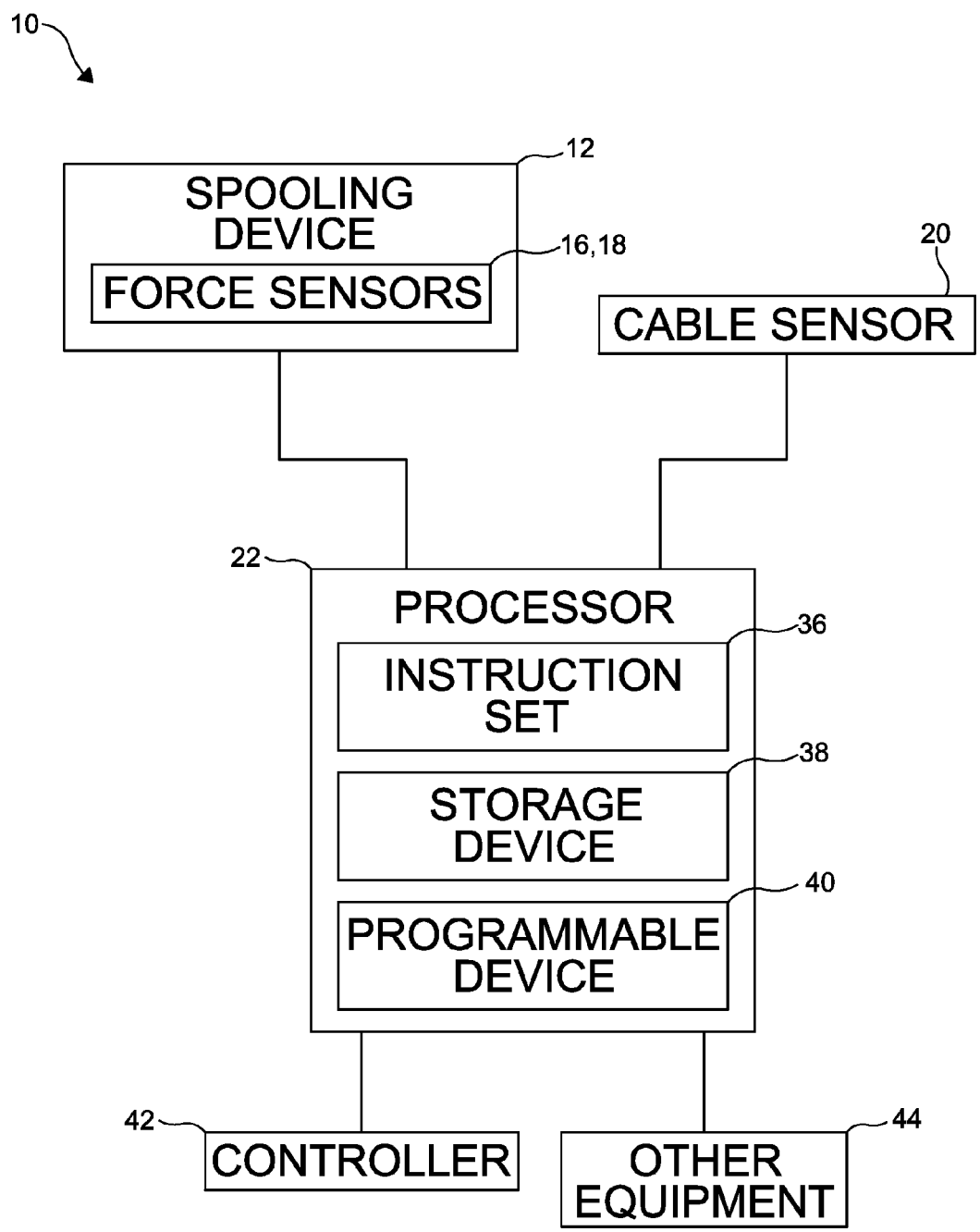

ASSEMBLY, SYSTEM AND METHOD FOR CABLE TENSION MEASUREMENT

BACKGROUND OF THE INVENTION

The statements in this section merely provide background information related to the present disclosure and may not constitute prior art.

The present invention generally relates to wellsite surface equipment such as wireline surface equipment and the like. In particular, the invention is directed to an assembly, a system, and a method for measuring a tension in a cable.

During a typical wireline operation a tool string is moved up and down in a well using a winch. Specifically, the tool string is attached to a cable, whereby the cable is spooled/unspooled on a drum. In this context, it is critical to monitor a tension in the cable to prevent operational pitfalls such as cable breaks (e.g. tool string stuck into the well), cable slacking (e.g. not enough cable tension), and the like.

Currently, cable tension is measured using a Cable Mounted Tension Device (CMTD), wherein the cable is trapped between three wheels and a shaft is deformed proportionally to the cable tension. For monitoring a tension in the cable, the shaft deformation is sensed by a strain gauge.

In certain instances, a conventional strain gauge has shown some reliability issues and the wheels of the CMTD can damage the winch cable (under high tension the CMTD could even break the cable).

More accurate assemblies, systems, and methods are needed for measuring the tension of a cable, without the use of a CMTD. It also remains desirable to provide improvements in wellsite surface equipment in efficiency, flexibility, reliability, and maintainability.

SUMMARY OF THE INVENTION

An embodiment of a tension measurement assembly for measuring and monitoring a tension force in a cable being deployed from a spooling device on which the cable is spooled, includes at least one force sensor disposed adjacent the spooling device for sensing a force applied to the spooling device and generating a force signal representing the sensed force, and a processor responsive to the force signal for calculating and monitoring a tension force present in the cable.

In an embodiment, a system for measuring and monitoring a tension force in a cable, includes: a spooling device for deploying and retrieving the cable spooled thereon, wherein said spooling device includes a support member; a force sensor disposed adjacent the support member of said spooling device for sensing a force on the support and generating a force signal representing the sensed force; a cable sensor disposed to measure spooling/unspooling characteristics of the cable and generate a spooling signal representing the measured spooling/unspooling characteristics; and a processor for computing and monitoring the tension force in the cable in response to the force signal and the spooling signal.

The invention also includes methods for measuring a tension of a cable.

In an embodiment, a method includes the steps of: providing a spooling device for deploying and retrieving the cable; directing the cable from the spooling device to a downstream point; providing a force sensor disposed adjacent the spooling device for sensing a force applied to the spooling device and generating a force signal representing the sensed force; providing a cable sensor disposed to measure spooling/unspooling characteristics of the cable and generate a spooling signal representing the measured spooling/unspooling characteristics; and calculating the tension force in the cable based on the force signal from the force sensor and the spooling signal from the cable sensor.

BRIEF DESCRIPTION OF THE DRAWINGS

These and other features and advantages of the present invention will be better understood by reference to the following detailed description when considered in conjunction with the accompanying drawings wherein:

FIG. 2 is a schematic block diagram of the tension measurement system and assembly of FIG. 1.

DETAILED DESCRIPTION OF THE INVENTION

Figure 1:
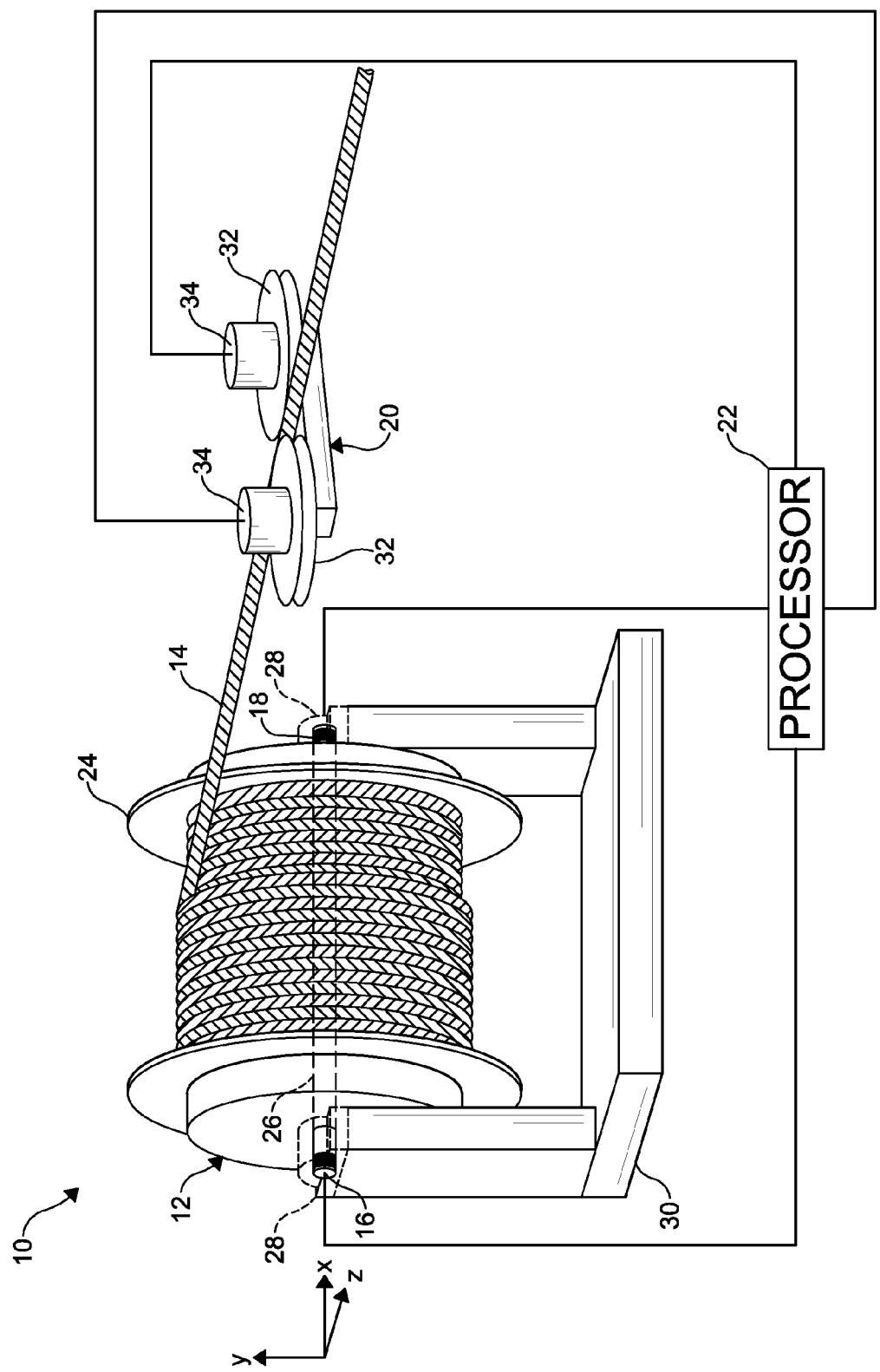
FIG. 1 is a schematic representation of a tension measurement system and assembly according to an embodiment of the present invention.

Referring now to FIGS. 1-2, there is shown an embodiment of a tension measurement system, indicated generally at 10. As shown, the tension measurement system 10 includes a spooling device 12 for spooling a cable 14, a plurality of force sensors 16, 18 positioned to measure forces acting on the spooling device 12, a cable sensor 20, and a processor 22 in communication with the force sensors 16, 18 and the cable sensor 20. Those skilled in the art will appreciate that the cable 14 may comprise a wireline electrical or electro-optical cable, a slickline cable, a length of coiled tubing, or a similar suitable spoolable device that is operable to be spooled onto the spooling device 12.

As shown in FIG. 1, the spooling device 12 includes a drum 24 having a shaft 26 (i.e. support member) disposed therethrough, wherein a portion of the shaft 26 extends from opposites sides of the drum 24. A pair of bearings 28 are disposed on a chassis 30 (e.g. cradle) and positioned to receive the portion of the shaft 26 extending from opposite sides of the drum 24. It is understood that the bearings 28 are mounted to the chassis 30 to provide support to the drum 24, while allowing the drum 24 to rotate for spooling and unspooling the cable 14. It is further understood that other support members may be used to engage the chassis 30 to support the drum 24, while allowing the drum 24 to rotate.

The force sensors 16, 18 are multi-axis force sensors. As a non-limiting example, each of the force sensors 16, 18 includes a plurality of independent strain gauges to measure force vectors along three pre-defined axes (i.e. pre-defined coordinate system), as well as measure the moments about each force vector. As a further non-limiting example, each of the force sensors 16, 18 includes a transducer for measuring and outputting forces along all three Cartesian coordinates (x, y and z). It is understood that the coordinate system of the force sensors 16, 18 can be configured in any orientation relative to the spooling device 12. It is further understood that any sensors can be used to measure forces acting on the spooling device 12 and output a force signal representing the measured forces such as a multi-axis force/torque transducer and a multi-axis load cell, known in the art.

In the embodiment shown, the force sensors 16, 18 are disposed adjacent the shaft 26, wherein each of the force sensors 16, 18 is adjacent an associated one of the bearings 28 in order to monitor the forces between the shaft 26 and the bearings 28 along at least one axis. In certain embodiments, at least one of the force sensors 16, 18 is integrated with the shaft 26. In certain embodiments, at least one of the force sensors 16, 18 is integrated with at least one of the bearings 28. It is understood that in context to the force sensors 16, 18, the phrase "disposed adjacent" can be defined as: nearby; abutting; integrated with; or a functional equivalent of the same. It is further understood that any number of the force sensors 16, 18 can be used to measure forces applied to the spooling device 12.

The cable sensor 20 is positioned to measure spooling/unspooling characteristics of the cable 14 or spoolable device such as spooling/unspooling rate of the cable 14 and a length of the cable 14 moving past the cable sensor 20 over a pre-determined time period, for example. It is understood that the cable sensor 20 can be adapted to measure any number of characteristics of the cable 14.

As a non-limiting example, the cable sensor 20 is a depth wheel adapted to engage the cable 14 to measure at least a length of the cable 14 passing thereby and a spooling/unspooling rate of the cable 14. As a further non-limiting example, the cable sensor 20 includes a plurality of measuring wheels 32 to engage the cable 14. Each of the measuring wheels 32 is mounted to an encoder assembly 34 such that a rotation of the measuring wheel 32 is monitored by an associated one of the encoder assemblies 34, as appreciated by one skilled in the art of encoders. A spooling signal (i.e. pulse output) is generated by the encoder assembly 34 in response to a rotation of an associated one of the measuring wheels 32. The spooling signal represents the spooling/unspooling characteristics of the cable 14 and can be analyzed to determine at least a length of the cable 14 passing through the cable sensor 20 and a spooling/unspooling rate of the cable 14. It is understood that any suitable sensor can be used to measure characteristics of the cable 14.

The processor 22 is in data communication with the force sensors 16, 18 and the cable sensor 20 to receive data signals (e.g. force signal and spooling signal) therefrom and analyze the signals based upon a pre-determined algorithm, mathematical process, or equation, for example. As shown in FIG. 2, the processor 22 analyzes and evaluates a received data based upon an instruction set 36. The instruction set 36, which may be embodied within any computer readable medium, includes processor executable instructions for configuring the processor 22 to perform a variety of tasks and calculations. It is understood that the instruction set 36 may include at least one of an algorithm, a mathematical process, and an equation for calculating a tension of the cable 14. It is further understood that the processor 22 may execute a variety of functions such as controlling various settings of the force sensors 16, 18 and the cable sensor 20, for example.

As a non-limiting example, the processor 22 includes a storage device 38. The storage device 38 may be a single storage device or may be multiple storage devices. Furthermore, the storage device 38 may be a solid state storage system, a magnetic storage system, an optical storage system or any other suitable storage system or device. It is understood that the storage device 38 is adapted to store the instruction set 36. In certain embodiments, data relating to the cable 14 or spoolable device (e.g. known, pre-determined, or measured) is stored in the storage device 38 such as a mass per unit length (i.e. weight per unit length), an overall length of the cable 14, and a history of previous measurements and calculations. Other data and information may be stored in the storage device 38 such as the parameters calculated by the processor 22 and a database of physical characteristics (e.g. mass per unit length) for various types of cable, for example. It is further understood that certain known parameters may be stored in the storage device 38 to be retrieved by the processor 22.

As a further non-limiting example, the processor 22 includes a programmable device or component 40. In certain embodiments, the programmable device includes a human-machine interface (not shown). It is understood that the programmable device or component 40 may be in communication with any other component of the tension measurement system 10 such as the force sensors 16, 18 and the cable sensor 20, for example. In certain embodiments, the programmable component 40 is adapted to manage and control processing functions of the processor 22. Specifically, the programmable component 40 is adapted to control the analysis of the data signals received by the processor 22. It is understood that the programmable component 40 may be adapted to store data and information in the storage device 38, and retrieve data and information from the storage device 38.

In certain embodiments, the processor 22 is in data communication with a controller or control system 42 to provide a centralized management of the system 10. As a non-limiting example, the processor 22 communicates with the control system 42 via a Controller Area Network (CAN) Bus. However, other networks, architectures, and protocols can be used. The processor 22 can also be in data communication with other equipment 44 for sending and receiving data and control signals therebetween.

In use, the system 10 is initialized when no cable tension is applied to the drum 24, thereby allowing the force sensors 16, 18 to identify the drum weight having no initial component forces due to a tension in the cable 14. The drum weight is defined as a weight of the drum 24 having a predetermined length of the cable 14 spooled thereon. The initial drum weight vector (including magnitude and direction relative to the coordinate system of the force sensors 16, 18) is stored on the storage device 38 and relied upon by the processor 22 to subsequently calculate a tension in the cable 14, as described herein below.

Once the initial drum weight vector is stored, the cable 14 is deployed and retrieved by the spooling device 12. As the cable 14 is routed past the cable sensor 20, the force sensors 16, 18 measure the forces along a pre-determined coordinate system, while the cable sensor 20 measures the spooling/unspooling characteristics of the cable 14. The processor 22 receives the force signals from the force sensors 16, 18 and the spooling signal from the cable sensor 20. The processor 22 analyzes the received signals to compute a tension in the cable 14.

It is understood that during operation, a length of the cable 14 that is spooled on the drum 24 is continuously changing. For example, when the cable 14 is deployed from the drum 24, a force acting on the shaft 26 of the spooling device 12 due to a weight of a spooled portion of the cable 14 is reduced. Conversely, when the cable 14 is retrieved and spooled onto the drum 24, a force acting on the shaft 26 of the spooling device 12 due to a weight of a spooled portion of the cable 14 is increased. As such, a portion of the forces measured by the force sensors 16, 18 is due to the weight of the drum 24 along with an instantaneous weight of the spooled portion of the cable 14. A remaining portion of the forces measured by the force sensor 16, 18 is directly proportional to a tension in the cable.

In certain embodiments, the processor 22 computes the instantaneous weight of the spooled portion of the cable 14 by analyzing of the initial weight of the drum 24 and a length of the cable 14 spooled thereon and a weight of a portion of the cable 14 that has been unspooled from the drum 24 since the initial weight was measured. It is understood that the instantaneous drum weight is equal to the initial drum weight less the weight of the portion of the cable 14 that has been unspooled since the initial drum weight was measured. It is further understood that, in situation where the cable 14 is being spooled onto the drum 24 after the initial weight was measured, the weight of a length of the cable 14 being spooled is additive to the initial drum weight.

As a non-limiting example, a length of the cable 14 that has been unspooled from the drum 24 since the initial drum weight was measured can be retrieved from the spooling signal generated by the cable sensor 20. The length of the cable 14 that has been unspooled since the initial drum weight was measured is multiplied by an associated weight per unit length (retrieved from the storage device 38) to compute a weight of a portion of the cable 14 that has been unspooled since the initial weight was measured. Accordingly, the initial drum weight minus the unspooled cable weight is equal to the weight of the drum along with the weight of a spooled portion of the cable 14. By zeroing the portion of the forces representing the weight of the drum 24 and the spooled portion of the cable 14, the remaining portion of the forces measured by the force sensors 16, 18 are analyzed using formulas known in mechanics to determine a tension in the cable 14.

As a non-limiting example, the forces measured by the force sensors 16, 18 along each of the axes can be summed to generate a single force vector along a path of travel of the cable 14. As a further example, the cable 14 is shown being deployed directly along a Z-axis of the coordinate system of the force sensors 16, 18. As such, the forces measured by the force sensors 16, 18 along the Y-axis are representative of a weight of the drum 24 and the spooled portion of the cable 14, while the cumulative forces measured by the force sensors 16, 18 along the Z-axis are representative of the tension in the cable 14. However, it is understood that the tension in the cable 14 can be computed in any path or direction relative to the coordinate system of the force sensors 16, 18 using components of the measured forces along the pre-defined axes, as would be appreciated by one skilled in classical mechanics. It is further understood that other equations, formulas, and algorithms can be used to calculate a tension in the cable 14. It is further understood that the cable 14 or spoolable device may be directed from the tension measurement system 10 to a wellbore penetrating a subterranean formation in order to perform operations within the wellbore such as, but not limited to, data logging operations, sampling operations, wellbore treatment operations such as, but not limited to, fracturing operations, acid treatment operations, perforating operations, completion operations, seismic operations, and the like.

The preceding description has been presented with reference to presently preferred embodiments of the invention. Persons skilled in the art and technology to which this invention pertains will appreciate that alterations and changes in the described structures and methods of operation can be practiced without meaningfully departing from the principle, and scope of this invention. Accordingly, the foregoing description should not be read as pertaining only to the precise structures described and shown in the accompanying drawings, but rather should be read as consistent with and as support for the following claims, which are to have their fullest and fairest scope.

We claim:

1. A tension measurement assembly for measuring and monitoring a tension force in a cable being deployed from a spooling device on which the cable is spooled, comprising:
   a spooling device comprising:
      a chassis;
      a drum between the chassis; and
      a shaft disposed through the drum and engaged with a bearing mounted on the chassis;
   a cable operatively disposed on the drum;
   a pair of force sensors, wherein one of the force sensors of the pair of force sensors is adjacent one end of the shaft and the other force sensors of the pair of force sensors is disposed adjacent the other end of the shaft, and wherein the pair of sensors are operatively positioned to measure the force between the shaft and bearings, and wherein the pairs of force sensors generate force signals representing the measured force between the shaft and bearings;
   a cable sensor operatively disposed to measure spooling/unspooling characteristics of the cable and generate a spooling signal representing the measured spooling/unspooling characteristics; and
   a processor for computing and monitoring the tension force in the cable in response to the force signals and the spooling signal, wherein the processor is in communication with a data storage, and wherein the data storage has an initial drum weight stored therein, wherein the initial drum weight equals the weight of the drum with a predetermined length of cable spooled thereon, and wherein the processor calculates an instantaneous weight of the drum using the spooling signal, and wherein the processor calculates tension on the cable using the force signals and calculated instantaneous weight.

2. The system according to claim 1, wherein said force sensors comprises a multi-axis force sensor.

3. The system according to claim 1, wherein said force sensors comprises a multi-axis transducer for measuring forces along a pre-determined coordinate system.

4. A tension measurement assembly for measuring and monitoring a tension force in a cable being deployed from a spooling device on which the cable is spooled, comprising:
   a spooling device comprising:
      a chassis;
      a drum between the chassis; and
      a shaft disposed through the drum and engaged with a bearing mounted on the chassis;
   a cable operatively disposed on the drum;
   a force sensor adjacent one end of the shaft, and operatively positioned to measure force between the shaft and bearings, and wherein the force sensor generates a force signal representing the measured force between the shaft and bearings;
   a cable sensor operatively disposed to measure spooling/unspooling characteristics of the cable and generate a spooling signal representing the measured spooling/unspooling characteristics; and
   a processor for computing and monitoring the tension force in the cable in response to the force signal and the spooling signal, wherein the processor is in communication with a data storage, and wherein the data storage has an initial drum weight stored therein, wherein the initial drum weight equals the weight of the drum with a predetermined length of cable spooled thereon, and wherein the processor calculates an instantaneous weight of the drum using the spooling signal, and wherein the processor calculates tension on the cable using the force signals and calculated instantaneous weight.

5. The system according to claim 4, wherein said force sensors comprises a multi-axis force sensor.

6. The system according to claim 4, wherein said force sensors comprises a multi-axis transducer for measuring forces along a pre-determined coordinate system.

7. The system according to claim 4, wherein said cable sensor comprises a measuring wheel to engage the cable and an encoder to measure a rotation of said measuring wheel due to a movement of the cable.

8. The system according to claim 4, wherein the spooling/unspooling characteristic of the cable is at least one of a spooling/unspooling rate and a length of the cable moving past said cable sensor in a pre-determined time period.

9. A method for measuring and monitoring a tension force in a spoolable device, comprising:
   providing a spooling device for deploying and retrieving the spoolable device, wherein the spooling device comprises a chassis, a drum between the chassis, and a shaft disposed through the drum and supported at each end by bearings on the chassis;
   directing the spoolable device from the spooling device to and from a downstream point;
   providing at least one force sensor disposed adjacent one of the ends of the shaft and operatively positioned to measure force between the bearing and end of the shaft, and generate a force signal representing the measured force;
   providing a spoolable device sensor disposed to measure spooling/unspooling characteristics of the spoolable device and generate a spooling signal representing the measured spooling/unspooling characteristics; and
   calculating the tension force in the spoolable device based on the force signal from the at least one force sensor and the spooling signal from the spoolable device sensor, wherein the calculating is performed using a processor in communication with a data storage, and wherein the data storage has an initial drum weight stored therein, wherein the initial drum weight equals the weight of the drum with a predetermined length of cable spooled thereon, and wherein the processor calculates an instantaneous weight of the drum using the spooling signal, and wherein the processor calculates tension on the cable using the force signals and calculated instantaneous weight.

10. The method according to claim 9, wherein the at least one force sensor is a multi-axis force sensor.

11. The method according to claim 9, wherein the spooling/unspooling characteristic of the spoolable device is at least one of a spooling/unspooling rate and a length of the spoolable device moving past the spoolable device sensor in a pre-determined time period.

12. The method according to claim 9, further comprising a step of calculating a drum weight, wherein the step of calculating the tension force in the spoolable device is based on the force signal from the force sensor, the spooling signal from the spoolable device sensor, and the drum weight.

13. The method according to claim 9, wherein the spoolable device comprises a wireline cable.

* * * * *